US009210299B2

(12) United States Patent
Murase et al.

(10) Patent No.: US 9,210,299 B2
(45) Date of Patent: Dec. 8, 2015

(54) ADAPTOR DEVICE FOR SOURCE DEVICE AND CONTROL METHOD OF ADAPTOR DEVICE FOR SOURCE DEVICE

(75) Inventors: Koichi Murase, Osaka (JP); Makoto Funabiki, Osaka (JP); Keiichiro Obayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1076 days.

(21) Appl. No.: 13/266,867

(22) PCT Filed: Nov. 4, 2010

(86) PCT No.: PCT/JP2010/006480
§ 371 (c)(1),
(2), (4) Date: Oct. 28, 2011

(87) PCT Pub. No.: WO2011/064947
PCT Pub. Date: Jun. 3, 2011

(65) Prior Publication Data
US 2012/0047538 A1 Feb. 23, 2012

(30) Foreign Application Priority Data

Nov. 24, 2009 (JP) .................................. 2009-265960

(51) Int. Cl.
*H04N 5/04* (2006.01)
*H04N 7/14* (2006.01)
(Continued)

(52) U.S. Cl.
CPC . *H04N 5/05* (2013.01); *H04N 5/46* (2013.01); *H04N 5/765* (2013.01);
(Continued)

(58) Field of Classification Search
CPC .................... H04N 21/43637; H04N 21/4622; H04N 7/20; H04N 7/106; H04L 12/2801
See application file for complete search history.

(56) References Cited

U.S. PATENT DOCUMENTS 6,195,393 B1 * 2/2001 Nemiroff et al. ........ 375/240.28
2005/0136990 A1 6/2005 Hardacker et al.
(Continued)

FOREIGN PATENT DOCUMENTS

JP 2006-148214 6/2006
JP 2007-6528 1/2007
(Continued)

OTHER PUBLICATIONS

International Search Report issued Dec. 7, 2010 in corresponding International Application No. PCT/JP2010/006480.

*Primary Examiner* — Benjamin R Bruckart
*Assistant Examiner* — Carmine Malangone
(74) *Attorney, Agent, or Firm* — Wenderoth, Lind & Ponack, L.L.P.

(57) ABSTRACT

An object of the present invention is to provide an adaptor device for a source device that can reduce a connection time to a switching destination in the case where a connection destination is switched. For this, an adaptor device for a source device (104) includes a storage unit (206) that stores format information that is information indicating the format of the video signal; a dummy signal generating unit (204) that generates a dummy signal that is a dummy video signal having the same format as that specified by the format information obtained from the storage unit (206); a control unit (203) that causes the dummy signal generating unit (204) to generate the dummy signal when the video signal is not obtained from the source device; and a wireless transmitting and receiving unit (202) that selectively wirelessly transmits the video signal and the generated dummy signal.

11 Claims, 11 Drawing Sheets

(51) Int. Cl.
| | |
|---|---|
| *H04N 5/38* | (2006.01) |
| *H04N 5/05* | (2006.01) |
| *H04N 5/46* | (2006.01) |
| *H04N 5/765* | (2006.01) |
| *H04N 21/41* | (2011.01) |
| *H04N 21/4147* | (2011.01) |
| *H04N 21/4363* | (2011.01) |
| *H04N 21/442* | (2011.01) |
| *H04L 12/28* | (2006.01) |
| *H04N 21/258* | (2011.01) |
| *H04N 9/79* | (2006.01) |
| *H04W 36/00* | (2009.01) |
| *H04W 76/02* | (2009.01) |

(52) U.S. Cl.
CPC ...... *H04N 21/4122* (2013.01); *H04N 21/4147* (2013.01); *H04N 21/43637* (2013.01); *H04N 21/44227* (2013.01); *H04L 2012/2841* (2013.01); *H04N 9/7921* (2013.01); *H04N 21/25825* (2013.01); *H04W 36/00* (2013.01); *H04W 76/02* (2013.01)

(56) References Cited

U.S. PATENT DOCUMENTS

| | | |
|---|---|---|
| 2005/0289631 A1 | 12/2005 | Shoemake |
| 2006/0095638 A1 | 5/2006 | Unger |
| 2006/0104311 A1 | 5/2006 | Soga et al. |
| 2007/0006269 A1 | 1/2007 | Huang et al. |
| 2008/0168519 A1 | 7/2008 | Rao et al. |
| 2009/0015655 A1 | 1/2009 | Yanagisawa |
| 2009/0322948 A1 | 12/2009 | Funabiki et al. |
| 2010/0066906 A1* | 3/2010 | Nakajima .......... 348/500 |
| 2010/0165912 A1 | 7/2010 | Funabiki et al. |
| 2011/0228932 A1 | 9/2011 | Iwamoto et al. |

FOREIGN PATENT DOCUMENTS

| | | |
|---|---|---|
| JP | 2008-22560 | 1/2008 |
| WO | 2007/094347 | 8/2007 |
| WO | 2007/097099 | 8/2007 |
| WO | 2010/070812 | 6/2010 |

* cited by examiner

| Item | |
|---|---|
| Image size | 720 × 480 |
| Scanning mode | Progressive scanning |
| Horizontal synchronous frequency | 31. 5 kHz |
| Vertical synchronous frequency | 60 Hz |
| Pixel frequency | 27 MHz |
| Color space information | RGB 4:4:4 |
| Sampling size | 24 Bits |
| ⋮ | |

ADAPTOR DEVICE FOR SOURCE DEVICE AND CONTROL METHOD OF ADAPTOR DEVICE FOR SOURCE DEVICE

TECHNICAL FIELD

The present invention relates to an adaptor device for a source device that is wire-connected to a plurality of source devices that output a video signal and wirelessly transmits the video signal obtained from one of the plurality of source devices, and a method for controlling the adaptor device for the source device in a wireless communications system that wirelessly transmits and receives a transmission signal including a video signal according to the HDMI (High-Definition Multimedia Interface) standard.

BACKGROUND ART

Patent Literature 1 discloses a wireless communications system that wirelessly relays and transmits EDID (Extended Display Identification Data) information according to the HDMI (High-Definition Multimedia Interface).

FIG. 11 is a block diagram showing a configuration of a conventional wireless communications system 1500 disclosed in Patent Literature 1. The wireless communications system 1500 includes a source device 801, a sink device 804, an adaptor device for a source device 802, and an adaptor device for a sink device 803.

First, a control unit 814 in the adaptor device for the sink device 803 reads the EDID information via a wired transmitting and receiving unit 813, a cable C2, a wired transmitting and receiving unit 817, and a control unit 818 from an EDID table 820 that a storage unit 819 has. The control unit 814 stores the read EDID information in an EDID table 816 in a storage unit 815.

Next, the source device 801 wirelessly transmits an authentication requesting signal to the sink device 804 via a cable C1, a wired transmitting and receiving unit 805, a wireless transmitting and receiving unit 806, and an antenna 810. The sink device 804 executes the authentication in response to the authentication requesting signal received via the antenna 811, the wireless transmitting and receiving unit 812, the wired transmitting and receiving unit 813, and the cable C2. Further, the sink device 804 wirelessly transmits an authentication completion signal to the source device 801 via the cable C2 and the adaptor device for the sink device 803.

The source device 801 receives the authentication completion signal via the antenna 810, the wireless transmitting and receiving unit 806, the wired transmitting and receiving unit 805, and the cable C1, and subsequently wirelessly transmits an EDID requesting signal to the sink device 804 via the cable C1 and the adaptor device for the source device 802.

In response to the received EDID requesting signal, the control unit 814 in the adaptor device for the sink device 803 generates an EDID responding signal including in the EDID information stored in the EDID table 816 that the storage unit 815 has, and wirelessly transmits the EDID responding signal to the source device 801.

The control unit 807 in the adaptor device for the source device 802 receives the EDID responding signal via the antenna 810 and the wireless transmitting and receiving unit 806, and stores the EDID information on the sink device 804, which is included in the EDID responding signal, in the EDID table 809 in the storage unit 808.

The source device 801 wirelessly transmits a connection completion notifying signal to the sink device 804 via the cable C1, the wired transmitting and receiving unit 805, the wireless transmitting and receiving unit 806, and the antenna 810.

When the sink device 804 receives the connection completion notifying signal via the adaptor device for the sink device 803 and the cable C2, the sink device 804 wirelessly transmits a connection completion responding signal to the source device 801 via the cable C2 and the adaptor device for the sink device 803.

After the wireless connection processing above is completed, the sink device 804 wirelessly transmits a device designating signal for selecting the source device 801 as the communication destination via the cable C2 and the adaptor device for the sink device 803. The source device 801 receives the device designating signal via the adaptor device for the source device 802 and the cable C1, and wirelessly transmits an ACK signal to the sink device 804 in response to the device designating signal. After that, an AV (Audio Visual) data transmission processing between the sink device 804 and the source device 801 is started via the adaptor device for the source device 802 and the adaptor device for the sink device 803.

As described above, according to the wireless communications system 1500 described in Patent Literature 1, in the sink device 804 and source device 801 including the wired interfaces, the adaptor device for the sink device 803 is attached to the sink device 804, and the adaptor device for the source device 802 is attached to the source device 801. Thereby, the sink device 804 can transmit and receive the EDID information and the video signal through a wireless line.

CITATION LIST

Patent Literature

[Patent Literature 1] Japanese Unexamined Patent Application Publication No. 2008-022560

SUMMARY OF INVENTION

Technical Problem

Unfortunately, in the conventional wireless communications system 1500, in the case where a user switches a plurality of source devices in use, the input signal to the sink device is once interrupted every time when the source device is switched.

For example, in the case where the user switches the source device from a first source device to a second source device, the video signal from the adaptor device for the sink device to the sink device is once interrupted by the switching. As a result, synchronization of the format of the video signal and audio signal transmitted and received that is established between the adaptor device for the sink device and the sink device according to the HDMI format is interrupted. Accordingly, after that, in the case where the video signal from the second source device is input from the adaptor device for the sink device to the sink device, the synchronization processing on the format of the video signal transmitted and received needs to be performed again between the adaptor device for the sink device and the sink device. As a result, the time until a video is displayed in the sink device after the source device is switched (switching time) is undesirably increased.

In order to solve the problem above, an object of the present invention is to provide an adaptor device for a source device that can reduce the switching time until a video signal of a switching destination is displayed in a sink device in the case where a source device to be connected is switched.

Solution to Problem

The adaptor device for the source device according to one aspect of the present invention is an adaptor device for a source device wire-connected to a source device that outputs a video signal, the adaptor device wirelessly transmitting the video signal obtained from the source device and comprising: a storage unit configured to store format information that is information indicating a format of the video signal; a dummy signal generating unit configured to generate a dummy signal that is a dummy video signal having a same format as a format specified by the format information obtained from the storage unit; a wireless transmitting and receiving unit configured to selectively wirelessly transmit the video signal and the generated dummy signal; and a control unit configured to cause the dummy signal generating unit to generate the dummy signal and cause the wireless transmitting and receiving unit to transmit the dummy signal when the video signal is not obtained from the source device.

According to the configuration, in the case where the control unit cannot obtain the video signal from the source device, the control unit can wirelessly transmit the dummy signal generated by the dummy signal generating unit.

As a result, even if the source device is switched, the adaptor device for the source device can transmit the video signal to the sink device (display device) without interruption. Thereby, the synchronization of the format of the video signal between the sink device and the adaptor device for the sink device that form a wireless communications system can be maintained.

As a result, even if the source device to be connected is switched, re-synchronization of the format of the video signal between the sink device and the adaptor device for the sink device is unnecessary, and the switching time until the video signal of a switching destination is displayed in the sink device can be reduced.

Specifically, the control unit is configured to cause the dummy signal generating unit to generate the dummy signal during a period from a time when the control unit starts a processing of switching a source device, from which the video signal is obtained, from the source device to other source device different from the source device to a time when the video signal output from the other source device is obtained.

Moreover, the control unit is configured to store the format information for specifying a format of the video signal obtained from the source device in the storage unit.

Thereby, in the case where the video signal cannot be temporarily obtained from the source device due to switching the source device, the dummy signal generating unit can generate a dummy signal having the same format as that of the video signal obtained from the other source device immediately before the switching. As a result, in the case where the format of the video signal to be obtained is the same before and after switching the source device, the synchronization of the format of the video signal between the sink device and the adaptor device for the sink device that form a wireless communications system can be maintained.

The adaptor device for the source device according to other aspect of the present invention further comprises a format converting unit configured to convert the format of the video signal, wherein the control unit is configured to cause the format converting unit to convert the format of the video signal obtained from the source device to a format specified by the format information stored in the storage unit if the formats are not the same.

According to the configuration, in the case where the source device is switched, the format converting unit can convert the format of the video signal output from a new source device to other format.

As a result, for example, even if the video signals output from a plurality of source devices have different formats, the formats are converted into the same format, and the video signal is output. Thereby, the synchronization of the format of the video signal between the sink device and the adaptor device for the sink device that form a wireless communications system can be maintained.

As a result, in the case where the source device to be connected is switched, the switching time until the video signal of a switching destination is displayed in the sink device can be reduced.

Moreover, the control unit is configured to store a history regarding the format information for specifying the format of the video signal obtained from the source device and the format information for specifying the format of the video signal obtained from other source device different from the source device for a predetermined period of time, and to store format information most frequently obtained in the history in the storage unit.

Thereby, even if the format of the video signal before switching the source device is different from that after switching the source device, the dummy signal generating device can predict a format having the highest probability as the format of the video signal to be obtained from the source device after switching, and generate a dummy signal having the same format as the predicted format.

Moreover, the control unit is configured to store, in the storage unit, format information for specifying a format corresponding to a format of a video with the highest quality of a plurality of formats of video signal that can be displayed on a display unit that displays the video signal wirelessly transmitted from the wireless transmitting and receiving unit.

Thereby, even if the formats of the video signals output from a plurality of source devices are different from each other, the format converting unit always can unify the formats to a format with the highest quality of the video formats that the display device can treat. Accordingly, the synchronization of the format of the video signal between the sink device and the adaptor device for the sink device that form a wireless communications system can be maintained, and the sink device can display the video with the highest quality.

The present invention can be implemented not only as such an adaptor device for a source device, but also as a method for controlling the adaptor device for the source device, as processings, including characteristic units included in the adaptor device for the source device, or a program product causing a computer to execute such characteristic processings. As a matter of course, such a program may be distributed via storage media such as a compact disc read only memory (CD-ROM) and transmission media such as the Internet.

Furthermore, the present invention can be introduced in a form of a Large Scale Integrated circuit (LSI) implementing some or all of the functions of such an adaptor device for a source device, or a wireless communications system including the adaptor device for the source device.

Advantageous Effects of Invention

As above, the present invention can provide an adaptor device for a source device that can reduce the switching time until the video signal of a switching destination is displayed in the sink device in the case where the source device to be connected is switched.

BRIEF DESCRIPTION OF DRAWINGS

FIG. 4 is a drawing showing a format information table according to Embodiment 1 or 2 of the present invention.

DESCRIPTION OF EMBODIMENTS

Hereinafter, embodiments according to the present invention will be described with reference to the drawings.

Embodiment 1

Figure 1:
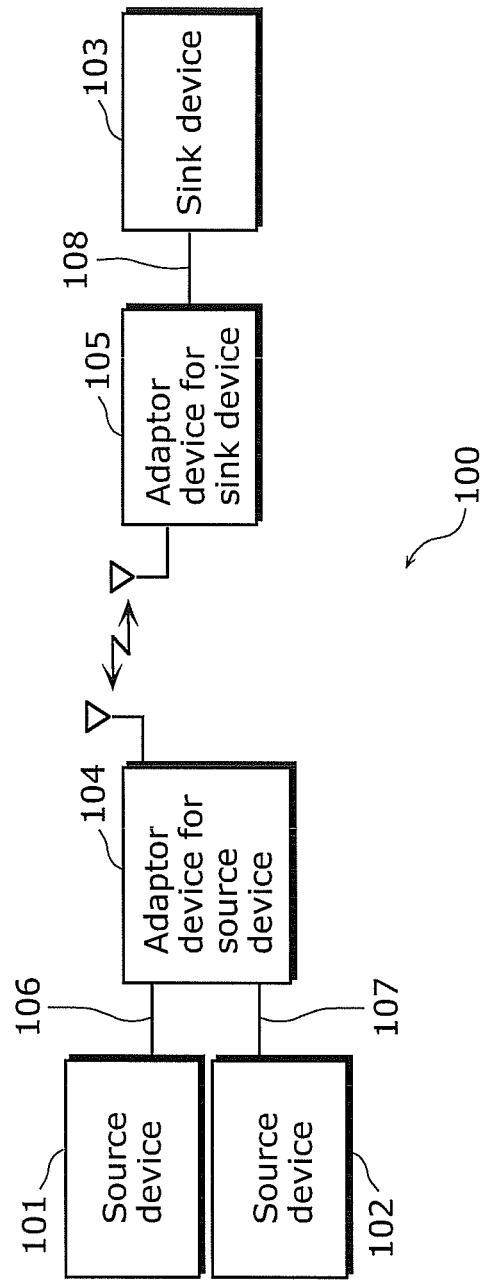
FIG. 1 is a block diagram showing an example of a configuration of a wireless communications system according to Embodiment 1 or 2 of the present invention.

FIG. 1 is a block diagram showing a wireless communications system 100 according to Embodiment 1 of the present invention.

As shown in FIG. 1, the wireless communications system 100 according to the present embodiment includes a source device 101 and source device 102 such as a DVD (Digital Versatile Disc) player, a sink device 103 such as a television receiver, an adaptor device for a source device 104, and an adaptor device for a sink device 105.

In FIG. 1, as an example, the case where two source devices wirelessly communicate with one sink device is illustrated. The numbers of the source devices and sink devices that form the wireless communications system 100 according to the present embodiment will not be limited to this, however. For example, one source device may wirelessly communicate with three or more sink devices, or two or more source devices may wirelessly communicate with two sink devices. Alternatively, a plurality of source devices may be connected to the adaptor device for the source device and a plurality of sink devices may be connected to the adaptor device for the sink device.

As described above, the source device 101 and the source device 102 are a video output device such as a DVD player and a BD (Blu-ray Disc (registered trademark)) player.

The sink device 103 is a display device such as liquid crystal displays, plasma displays, and projectors.

The source device 101, the source device 102, and the sink device 103 include a wired interface according to the HDMI standard as an input and output interface for an AV signal and a control signal.

Here, the AV signal is a video signal obtained by a reproduction processing such as a decoding processing on a content included in the source device 101. The AV signal may include not only the video signal but also an audio signal.

The control signal is a signal needed for an authentication processing and a synchronization processing of the video signal, for example, performed among the source device, the adaptor device for the source device, the adaptor device for the sink device, and the sink device in order to transmit the AV signal from the source device to the sink device in the format that can be displayed in the sink device. More specifically, the control signal includes an authentication requesting signal, an authentication responding signal, an EDID requesting signal, an EDID responding signal, a connection completion notifying signal, and a connection completion responding signal, which will be described later, but is not limited to these within the scope of the purpose above.

The adaptor device for the source device 104 is wire-connected to the source device 101 and the source device 102, and is an adaptor device for wirelessly transmitting the AV signal output from one of the source devices to the sink device 103.

The adaptor device for the sink device 105 is wire-connected to the sink device 103, and is an adaptor device for receiving the AV signal wirelessly transmitted from the adaptor device for the source device 104, and outputting the received AV signal to the sink device 103.

The adaptor device for the source device 104 and the adaptor device for the sink device 105 each include a wireless interface and a wired interface according to the HDMI standard as the input and output interface for an AV signal and a control signal. As the standard of the wireless interface, a wireless LAN (Local Area Network) and Transfer Jet (registered trademark) are presumed, for example. It may be a standard using any electromagnetic wave such as infrared rays.

The source device 101 is connected to the adaptor device for the source device 104 via a cable 106. The adaptor device for the source device 104 is connected to the source device 102 via a cable 107. The adaptor device for the sink device 105 is connected to the sink device 103 via a cable 108. These devices transmit and receive the AV signal and the control signal to and from each other using the wired interface. The cables 106 and 107 are an HDMI cable, for example.

Figure 2:
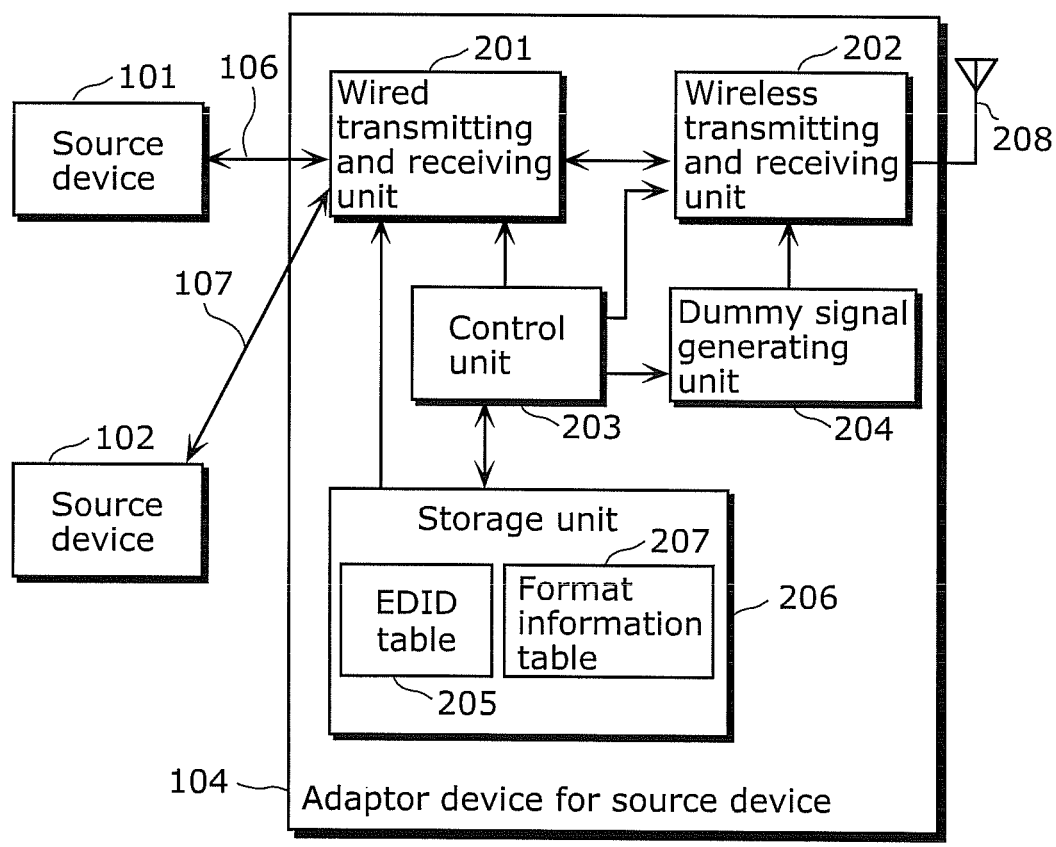
FIG. 2 is a block diagram showing an example of a configuration of an adaptor device for a source device according to Embodiment 1 of the present invention.

FIG. 2 is a detailed block diagram showing an example of a configuration of the adaptor device for the source device 104 according to the present embodiment.

In FIG. 2, the adaptor device for the source device 104 includes a wired transmitting and receiving unit 201, a wireless transmitting and receiving unit 202, a control unit 203, a dummy signal generating unit 204, a storage unit 206, an EDID table 205, a format information table 207, and an antenna 208.

According to control by the control unit 203, the wired transmitting and receiving unit 201 wirelessly transmits the AV signal, which is obtained via the cable 106 or 107 from the source device 101, to the adaptor device for the sink device 105 via the wireless transmitting and receiving unit 202 and the antenna 208. The wired transmitting and receiving unit 201 receives the control signal from the adaptor device for the sink device 105 via the antenna 208 and the wireless transmitting and receiving unit 202. Furthermore, the wired transmitting and receiving unit 201 transmits the received control signal to at least one of the source devices via the cables 106 and 107.

The wired transmitting and receiving unit 201 includes a switching unit, not illustrated, which selects the AV signal from one of the source device 101 and the source device 102 according to the control by the control unit 203. The switching unit may have any configuration because the configuration of the switching unit is not essential to the present invention. For example, it may be a mechanical configuration using a 3-contact switch, or a digital configuration using a microcomputer.

The wireless transmitting and receiving unit 202 encodes the AV signal obtained from the source device 101 or the source device 102 and a dummy signal generated by the dummy signal generating unit 204 to generate a transmission packet. The wireless transmitting and receiving unit 202 modulates a carrier wave at a predetermined frequency according to the generated transmission packet to generate a wireless AV signal including the AV signal. The wireless transmitting and receiving unit 202 transmits the wireless AV signal via the antenna 208 to the adaptor device for the sink device 105.

The wireless transmitting and receiving unit 202 encodes the control signal output from the control unit 203, and generates a transmission packet. The wireless transmitting and receiving unit 202 modulates a carrier wave at a predetermined frequency according to the generated transmission packet to generate a wireless control signal including the control signal. The wireless transmitting and receiving unit 202 transmits the wireless control signal via the antenna 208 to the adaptor device for the sink device 105.

The wireless transmitting and receiving unit 202 performs a frequency conversion processing, a reception packet processing, and a decoding processing on the wireless control signal at a predetermined frequency received from the adaptor device for the sink device 105 via the antenna 208. Subsequently, the wireless transmitting and receiving unit 202 outputs the wireless control signal to the control unit 203 as a control signal.

The control unit 203 executes a wireless connection processing on the basis of the control signal received from the adaptor device for the sink device 105 via the antenna 208 and the wireless transmitting and receiving unit 202. The control unit 203 controls the storage unit 206, and reads and writes the data such as format information. According to operation by a user, the control unit 203 controls the switching unit provided with the wired transmitting and receiving unit 201, and switches (selects) the source device from which the video signal is obtained.

The storage unit 206 is a semiconductor memory element such as a DRAM (Dynamic Random Access Memory), for example. The storage unit 206 includes the EDID table 205 and the format information table 207.

The EDID table 205 holds the EDID information on the sink device currently connected.

In the case where the adaptor device for the source device 104 is not wirelessly connected with the sink device at present, the storage unit 206 holds the EDID information on the sink device that is the previous wireless connection destination.

The source device 101 obtains the EDID information on the sink device 103 wirelessly connected from the EDID table 205 via the cable 106.

The source device 102 obtains the EDID information on the wirelessly connected sink device 103 from the EDID table 205 via the cable 107.

The format information table 207 holds the format information that specifies the format of the AV signal obtained from the source device currently connected and output from the wired transmitting and receiving unit 201 to the sink device. The format information includes the image size, scanning mode, horizontal synchronous frequency, vertical synchronous frequency, pixel frequency of the video signal, for example.

The dummy signal generating unit 204 obtains the format information from the format information table 207. The dummy signal generating unit 204 further generates a dummy signal that is a dummy video signal having the same format as that specified by the format information, and outputs the generated dummy signal to the wireless transmitting and receiving unit 202.

Figure 3:
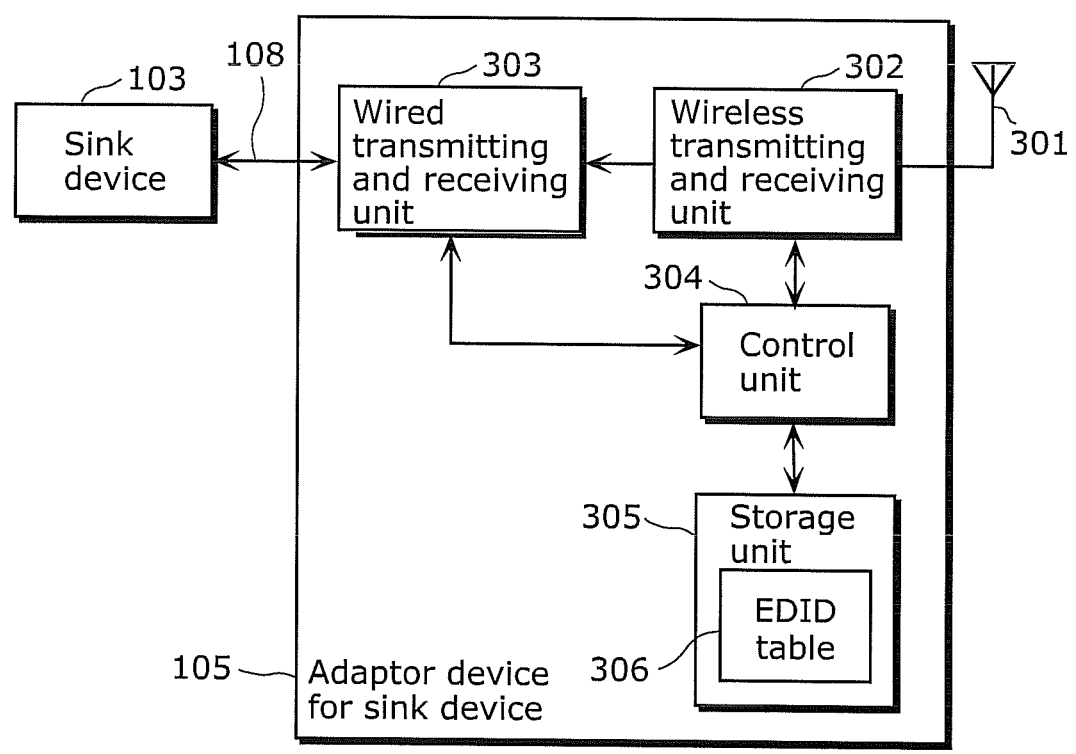
FIG. 3 is a block diagram showing an example of a configuration of an adaptor device for a sink device according to Embodiment 1 or 2 of the present invention.

FIG. 3 is a detailed block diagram showing an example of a configuration of the adaptor device for the sink device 105 according to the present embodiment.

As shown in FIG. 3, the adaptor device for the sink device 105 includes an antenna 301, a wireless transmitting and receiving unit 302, a wired transmitting and receiving unit 303, a control unit 304, a storage unit 305, and an EDID table 306.

Via the antenna 301, the wireless transmitting and receiving unit 302 receives a wireless AV signal transmitted from the adaptor device for the source device 104. Subsequently, the wireless transmitting and receiving unit 302 performs a frequency conversion processing, a reception packet processing, and a decoding processing, for example, on the received wireless AV signal, and outputs the AV signal subjected to the processings to the sink device 103 via the cable 108.

The wireless transmitting and receiving unit 302 performs the frequency conversion processing, the reception packet processing, and the decoding processing, for example, on the wireless control signal received from the antenna 301, and outputs the control signal after the processings to the control unit 304.

The wireless transmitting and receiving unit 302 encodes the control signal output from the control unit 304 to generate a transmission packet. The wireless transmitting and receiving unit 302 modulates a carrier wave at a predetermined frequency according to the generated transmission packet to generate a wireless control signal including the control signal. The wireless transmitting and receiving unit 302 wirelessly transmits the generated wireless control signal to the adaptor device for the source device 104.

The wired transmitting and receiving unit 303 transmits the AV signal, which is received from the adaptor device for the source device 104 via the antenna 301 and the wireless transmitting and receiving unit 302, to the sink device 103 via the cable 108. The wired transmitting and receiving unit 303 receives the EDID information from the sink device 103 via the cable 108, and outputs the EDID information to the control unit 304.

The control unit 304 generates a variety of control signals (including the authentication requesting signal, the authentication completion signal, the EDID requesting signal, the EDID responding signal, the connection completion notifying signal, and the connection completion responding signal.), and outputs those signals to the wireless transmitting and receiving unit 302. The control unit 304 also performs the wireless connection processing on the basis of the control signal received from the adaptor device for the source device 104 via the antenna 301 and the wireless transmitting and receiving unit 302.

The control unit 304 writes the EDID information obtained from the sink device 103 to the EDID table 306, and reads the EDID information from the EDID table 306 when necessary.

FIG. 4 shows an example of the format of the AV signal information stored in the format information table 207 provided with the adaptor device for the source device 104.

As shown in FIG. 4, the format information table holds the information for specifying the format of the data to be transmitted from the source device to the sink device.

With reference to FIG. 4, the format information includes an image size (effective pixels and total pixels), a scanning mode (the progressive scanning or the interlaced scanning), a horizontal synchronous frequency, a vertical synchronous frequency, and a pixel frequency as the video format that is the format information on the video signal. The format information also includes a sampling frequency, a sample size (the number of bits), the number of channels, and the coding format information as the audio format that is the format information on the audio signal.

The format information shown in FIG. 4 is an example. The format information may indirectly specify the information, or may include information other than the shown information.

Figure 5:
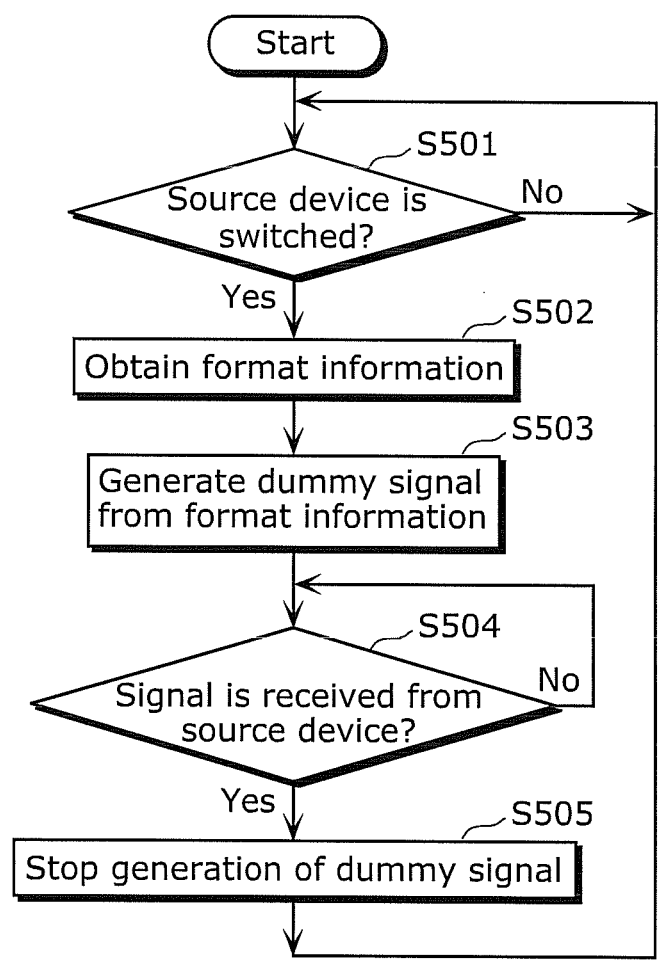
FIG. 5 is a flowchart showing a dummy signal generation processing by a control unit according to Embodiment 1 or 2 of the present invention.

FIG. 5 is a flowchart showing a dummy signal generation processing by the control unit 203.

In Step S501 of FIG. 5, first, the control unit 203 determines whether the source device from which the AV signal is obtained is switched. In the case of YES, the process proceeds to Step S502. In the case of NO, the control unit 203 goes back to Step S501, and repeats the processing of detecting switching of the source device.

Next, in Step S502, the control unit 203 obtains the format information from the format information table 207. Then, the process proceeds to Step S503.

Next, in Step S503, the control unit 203 outputs the obtained format information to the dummy signal generating unit 204. The dummy signal generating unit 204 generates a dummy signal. The dummy signal generating unit 204 generates the dummy signal that is a dummy video signal having the same format as that specified by the input format information. The dummy signal generating unit 204 wirelessly transmits the generated dummy signal to the adaptor device for the sink device 105 via the wireless transmitting and receiving unit 202 and the antenna 208.

The adaptor device for the sink device 105 transmits the received dummy signal to the sink device 103. Reception of the dummy signal by the sink device 103 can maintain synchronization of the format of the AV signal established between the sink device 103 and the adaptor device for the sink device 105 even if no AV signal is input.

The timing to synchronize the format of the AV signal initially established between the sink device 103 and the adaptor device for the sink device 105 will be described in the whole processing sequence of the wireless communications system 100 described later.

Next, in Step S504, the control unit 203 determines whether an AV signal is received from the new source device as the switching destination via the wired transmitting and receiving unit 201. In the case of YES, the process proceeds to Step S505. In the case of NO, the process goes back to Step S504, and the processing of waiting the AV signal received from the source device is repeated.

Next, in Step S505, the control unit 203 stops generation of the dummy signal by the dummy signal generating unit 204. Then, the process goes back to Step S501. At this time, transmission of the AV signal from the newly connected source device to the sink device 103 is ready, and the synchronization between the adaptor device for the sink device 105 and the sink device 103 by the dummy signal does not need to be maintained any longer.

The processing by the control unit 203 described above will be more specifically described with reference to FIG. 2.

Here, suppose that at present, the adaptor device for the source device 104 obtains the AV signal from the source device 101, and the adaptor device for the source device 104 wirelessly transmits the obtained AV signal to the sink device 103. The control unit 203 stores the format information for specifying the format of the AV signal output from the currently connected source device as the format information stored in the format information table 207. The format of the AV signal output by the source device 101 is the same as that output by the source device 102.

In this case, the control unit 203 obtains the format information on the AV signal output from the source device 101 from the wired transmitting and receiving unit 201, and stores the format information in the format information table 207.

Here, suppose that the source device from which the AV signal is obtained is switched from the source device 101 to the source device 102 by an instruction from the user via a user interface provided with the adaptor device for the source device 104, or a control signal from other device, for example. Then, the control unit 203 instructs the wired transmitting and receiving unit 201 to obtain the AV signal output from the source device 102. According to the instruction by the control unit 203, the wired transmitting and receiving unit 201 controls the switching unit (not illustrated) so as to obtain the AV signal output from the source device 102.

When the control unit 203 receives an instruction to switch the source device from the user or other device that forms the wireless communications system 100, the control unit 203 obtains the format information from the format information table 207, and outputs the format information to the dummy signal generating unit 204. Further, the control unit 203 instructs the dummy signal generating unit 204 to generate a dummy signal.

As described above, the dummy signal generating unit 204 generates a dummy signal according to the input format information, and outputs the dummy signal to the wireless transmitting and receiving unit 202.

According to the instruction by the control unit 203, the wireless transmitting and receiving unit 202 wirelessly transmits the dummy signal output from the dummy signal generating unit 204 to the adaptor device for the sink device 105 via the antenna 208.

After the source device from which the AV signal is obtained is switched by the switching unit, the control unit 203 monitors whether the wired transmitting and receiving unit 201 obtains the AV signal from the switching destination source device. When the control unit 203 detects that the wired transmitting and receiving unit 201 has obtained the AV signal from the switching destination source device, the control unit 203 causes the dummy signal generating unit 204 to stop generation of the dummy signal. When the dummy signal is not output from the dummy signal generating unit 204, the data output from the source device 102 is output to the wireless transmitting and receiving unit 202. Accordingly, wireless transmission of the AV signal from the adaptor device for the source device 104 is not interrupted.

In the case where the video signal is output as the dummy signal, the dummy signal generated by the dummy signal generating unit 204 may be any video signal having a format whose image size, scanning mode, pixel frequency, horizontal synchronous frequency, and vertical synchronous frequency are the same as those in the format information stored in the format information table 207. For example, it may be a white or black video signal having a format whose image size, scanning mode, pixel frequency, horizontal synchronous frequency, vertical synchronous frequency are the same as those in the format specified by the format information stored in the format information table 207.

The flowchart in FIG. 5 is an example. The control unit 203 may determine whether the AV signal is received from the source device in the same manner as in Step S504 before the control unit 203 obtains the format information from the format information table 207 in Step S502.

Instead of Step S501, Step S504 may be used. Namely, the control unit 203 may determine whether the AV signal is received from the source device (S504), instead of determining whether the source device that outputs the AV signal to be input is switched (Step S501). Thus, the dummy signal can be output not only in the case where the source device is switched but also in the case where the AV signal from the source device is interrupted.

The timing when the generation of the dummy signal is stopped may not be the timing described in the present embodiment. The timing may be any timing when the wireless transmitting and receiving unit 202 can obtain the signal to be transmitted (one of the AV signal and the dummy signal) without interruption during wireless transmission.

Figure 6:
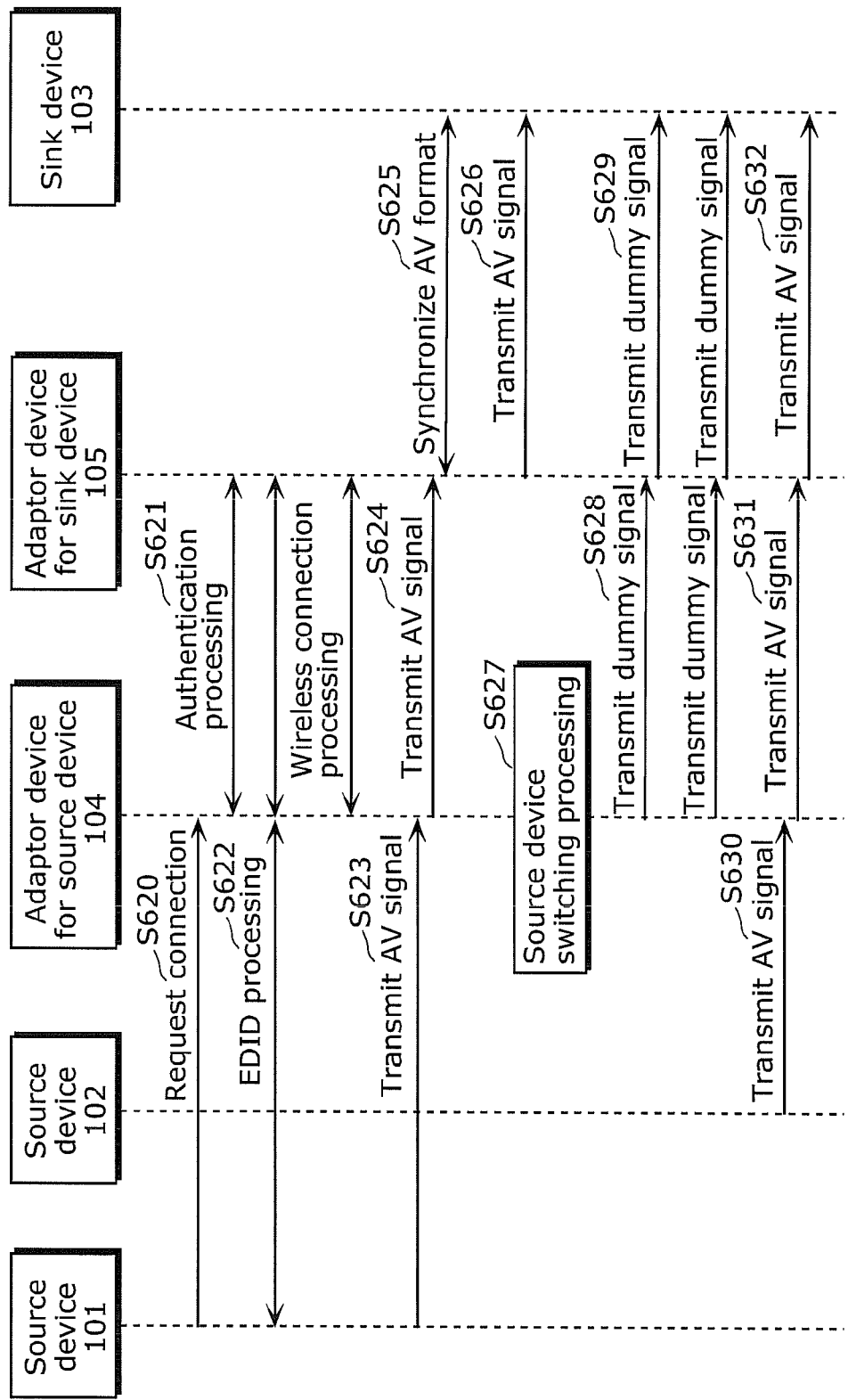
FIG. 6 is a drawing showing a sequence of the processings among devices that form a wireless communications system according to Embodiment 1 of the present invention.

FIG. 6 is a drawing showing a sequence of the processings among the devices that form the wireless communications system 100 according to Embodiment 1 of the present invention.

Here, the adaptor device for the sink device 105 obtains the EDID information from the sink device 103 in advance, and stores the EDID information in the EDID table 306. In the format information table 207 in the adaptor device for the source device 104, the control unit 203 stores the format information for specifying the format of the AV signal output by the source device 102.

First, for example, by operation of the user, the switching unit (not illustrated) provided with the adaptor device for the source device 104 internally connects the source device 101 to the wired transmitting and receiving unit 201. Then, the source device 101 outputs the control signal including a connection request to the adaptor device for the source device 104 (S620).

Next, as preparation for wireless communication, an authentication processing is performed between the adaptor device for the source device 104 and the adaptor device for the sink device 105 (S621).

Next, the source device 101 performs a processing for obtaining the EDID information on the sink device 103 from the adaptor device for the sink device 105 via the adaptor device for the source device 104 (S622). Subsequently, a connection processing is completed between the adaptor device for the source device 104 and the adaptor device for the sink device 105 to enable transmission and reception of the AV signal via a wireless line.

Next, when the source device 101 outputs the AV signal to the adaptor device for the source device 104 (S623), the adaptor device for the source device 104 wirelessly transmits the AV signal to the adaptor device for the sink device 105 (S624).

Next, the sink device 103 and the adaptor device for the sink device 105 perform the synchronization processing of the format of the AV signal (S625). This is performed in order to change the setting of the sink device 103 such that the sink device 103 correctly reproduces the AV signal transmitted from the adaptor device for the sink device 105. Specifically, the resolution and the synchronization frequency are set such that (1) the adaptor device for the sink device 105 transmits the format of the AV signal information to be transmitted to the sink device 103, and (2) the sink device 103 displays the received format information.

After synchronization of the format of the AV signal is completed, the AV signal is transmitted from the adaptor device for the sink device 105 to the sink device 103 via the cable 108 (for example, cables that can sequentially transmit non-compressed video information such as an HDMI cable) (S626).

Next, by operation of the user, the switching unit provided with the adaptor device for the source device 104 internally connects the source device 102 instead of the source device 101 to the wired transmitting and receiving unit 201 (S627).

Then, the dummy signal generating unit 204 provided with the adaptor device for the source device 104 generates a dummy signal, and wirelessly transmits the generated dummy signal from the wireless transmitting and receiving unit 202 to the adaptor device for the sink device 105 (S628).

The adaptor device for the sink device 105 transmits the obtained dummy signal to the sink device 103 (S629). Thereby, the synchronization of the format of the AV signal established in Step S625 can be maintained.

Next, when the source device 102 of a switching destination outputs the AV signal to the adaptor device for the source device 104 (S630), the adaptor device for the source device 104 wirelessly transmits the AV signal to the adaptor device for the sink device 105 (S631). The dummy signal generating unit 204 stops generation of the dummy signal.

The adaptor device for the sink device 105 transmits the obtained AV signal to the sink device 103 instead of the dummy signal (S632).

As described above, the wireless communications system 100 according to the present embodiment includes the adaptor device for the source device 104 wire-connected to the source device that outputs the video signal, the adaptor device wirelessly transmitting the video signal obtained from the source device. The adaptor device for the source device 104 includes the storage unit 206 that stores the format information as the information indicating the format of the video signal; the dummy signal generating unit 204 that generates the dummy signal that is a dummy video signal having the same format as that specified by the format information obtained from the storage unit 206; the wireless transmitting and receiving unit 202 that selectively wirelessly transmits the video signal and the generated dummy signal; and the control unit 203 that generates the dummy signal by the dummy signal generating unit 204 in the case where the video signal is not obtained from the source device, and transmits the generated dummy signal from the wireless transmitting and receiving unit 202.

As a result, the sink device 103 can maintain the synchronization of the format of the AV signal. Accordingly, in the case where the source device to be connected is switched, the switching time until the video signal of a switching destination is displayed in the sink device can be reduced.

Embodiment 2

In the present embodiment, the case where all the formats of the AV signals wirelessly transmitted from the adaptor device for the source device 104 are converted to the same format will be described.

Figure 7:
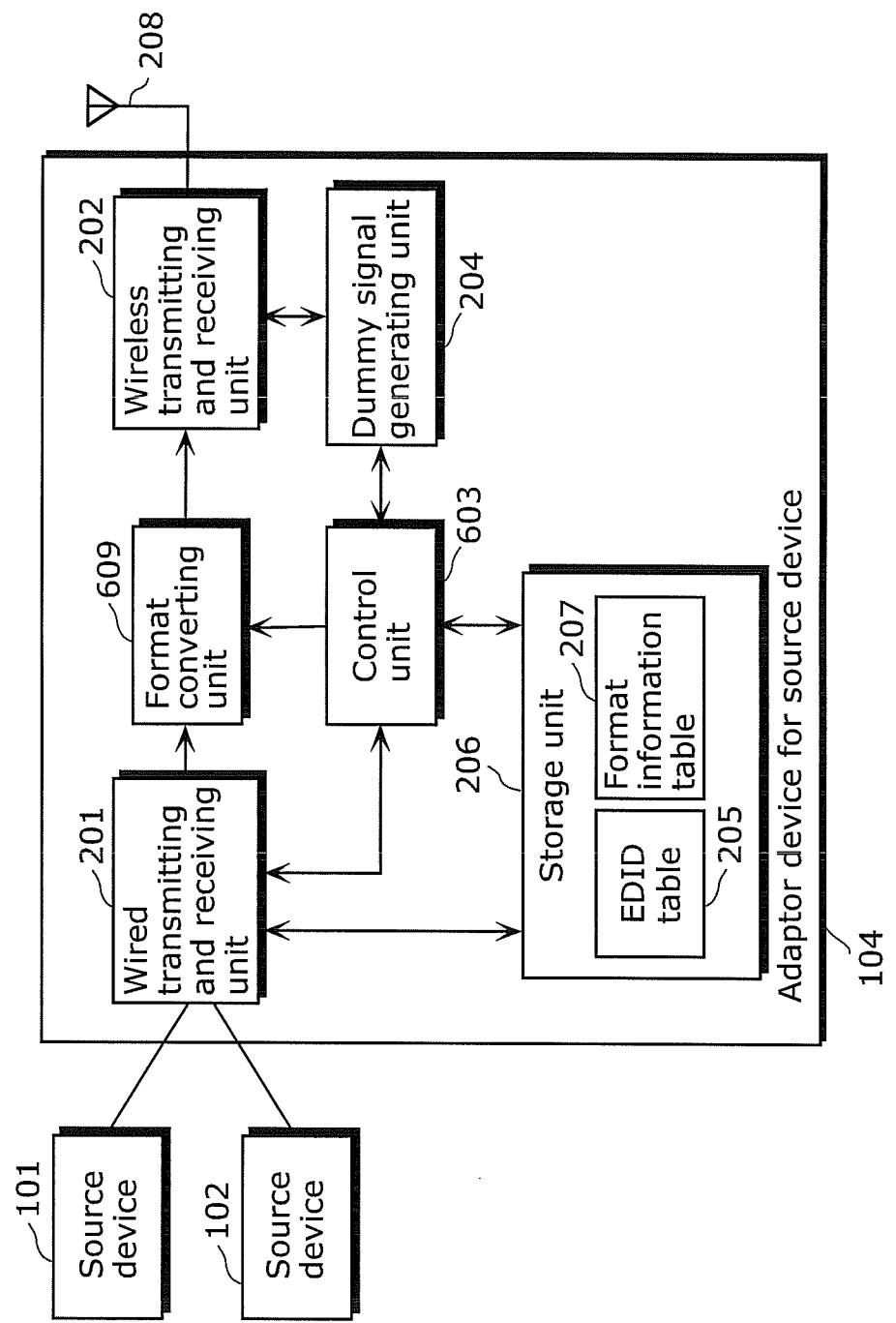
FIG. 7 is a block diagram showing an example of a configuration of an adaptor device for a source device according to Embodiment 2 of the present invention.

FIG. 7 is a block diagram showing an example of a configuration of the adaptor device for the source device 104 included in the wireless communications system 100 according to Embodiment 2 of the present invention.

As shown in FIG. 7, the adaptor device for the source device 104 includes the adaptor device for the source device 104 according to Embodiment 1, and a format converting unit 609. Same reference numerals will be given to components that operate in the same manner as those in Embodiment 1, and the detailed description thereof will be omitted.

A control unit 603 writes and reads the format information to and from the format information table 207. The control unit 603 extracts the format information from the AV signal obtained from the wired transmitting and receiving unit 201, and stores the format information in the format information table 207. When the control unit 603 detects that the format of the AV signal obtained by the wired transmitting and receiving unit 201 is changed by switching the source device connected to the adaptor device for the source device 104, the control unit 603 outputs the format information read from the format information table 207 to the format converting unit 609.

When the format converting unit 609 obtains the format information from the control unit 603, the format converting unit 609 converts the format of the AV signal obtained from the wired transmitting and receiving unit 201 to the format specified by the format information obtained from the control unit 603. Then, the format converting unit 609 outputs the converted format to the wireless transmitting and receiving unit 202.

Similarly to the case in Embodiment 1, the dummy signal generating unit 204 generates the dummy signal after the source device is switched and until the wired transmitting and receiving unit 201 obtains the AV signal from the newly connected source device, and outputs the dummy signal to the wireless transmitting and receiving unit 202.

Figure 8:
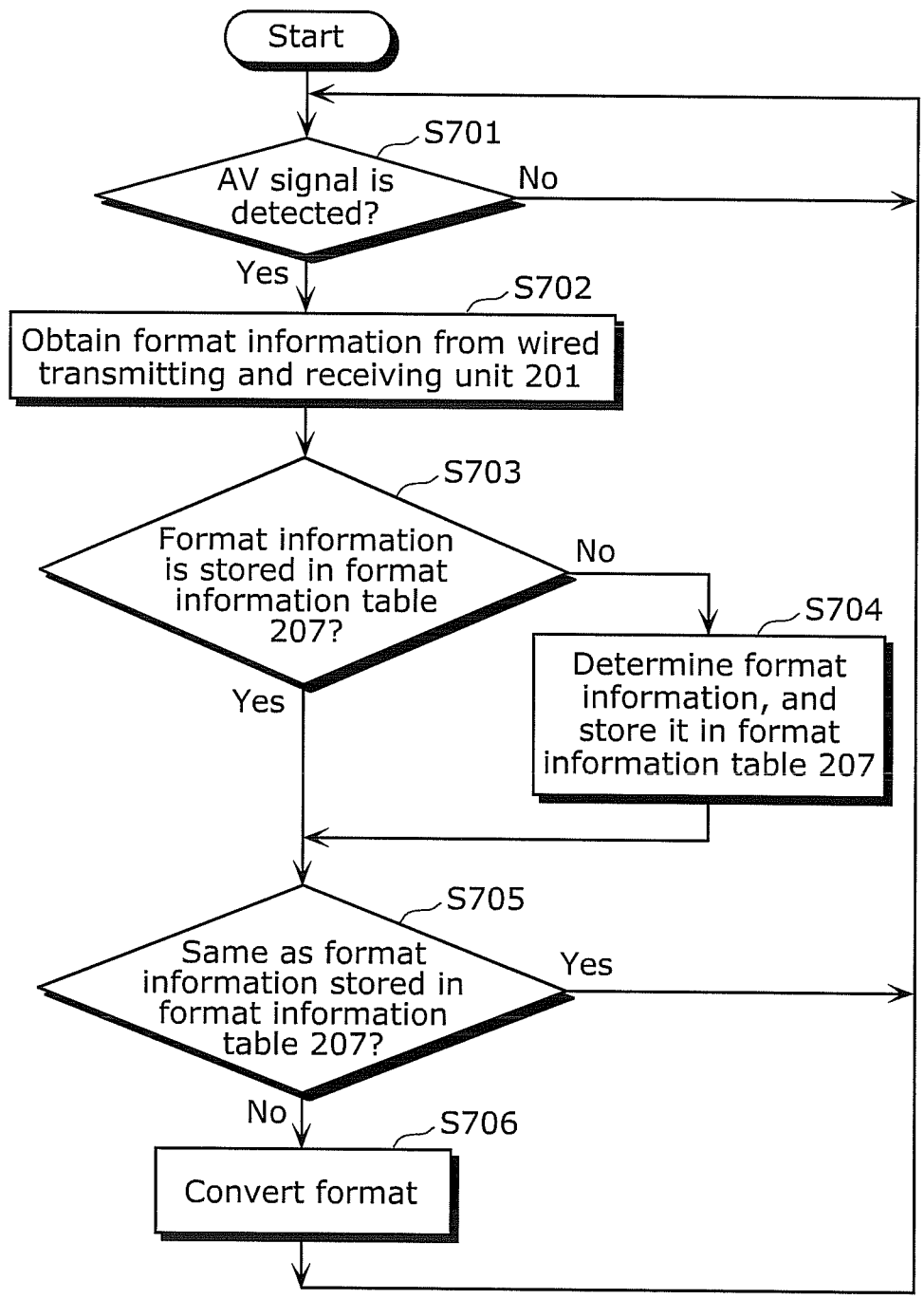
FIG. 8 is a flowchart showing a format conversion processing by a control unit according to Embodiment 2 of the present invention.

FIG. 8 is a flowchart showing the format conversion processing by the control unit 603 and the format converting unit 609.

In Step S701 of FIG. 8, first, the control unit 603 determines whether the AV signal is input from the newly switched source device to the wired transmitting and receiving unit 201. When the input is detected (Yes in S701), the process proceeds to Step S702. On the other hand, when the input is not detected (No in S701), the process goes back to Step S701, and the control unit 603 repeats the detecting processing of the AV signal.

Next, in Step S702, from the wired transmitting and receiving unit 201, the control unit 603 obtains the format information on the AV signal output from the source device.

Next, the control unit 603 determines whether the format information is stored in the format information table 207 (S703). Here, if the format information is already stored in the format information table 207, the process proceeds to Step S705 (Yes in S703). On the other hand, unless the format information is already stored in the format information table 207, the control unit 603 determines the format information to be stored, and stores the format information in the format information table 207 (S704). Then, the process proceeds to Step S705. A method for determining the format information to be stored (namely, to be stored in the format information table 207 that the storage unit 206 has) by the control unit 603 will be described later.

In Step S705, the control unit 603 checks whether the format information stored in the format information table 207 is the same as that obtained in Step S702. If the format information stored in the format information table 207 is the same as that obtained in Step S702, conversion of the format is unnecessary. Accordingly, the control unit 603 does not instruct the format converting unit 609 to perform any processing, and the process goes back to Step S701. On the other hand, unless the format information stored in the format information table 207 is the same as that obtained in Step S702, the process proceeds to Step S706.

In Step S706, the control unit 603 outputs the format information stored in the format information table 207 to the format converting unit 609. By the control unit 603, the format converting unit 609 converts the format of the AV signal output from the wired transmitting and receiving unit 201 to the format specified by the format information obtained from the format information table 207. The wireless transmitting and receiving unit 202 wirelessly transmits the AV signal having the converted format to the adaptor device for the sink device 105.

Subsequently, the control unit 603 returns the processing to Step S701.

Next, with reference to FIG. 8, the processing will be more specifically described.

First, suppose that the output destination for the AV signal is switched from the source device 101 to the source device 102.

The control unit 603 monitors whether the wired transmitting and receiving unit 201 obtains the AV signal. When the control unit 603 detects that the wired transmitting and receiving unit 201 has obtained the AV signal from the source device 101, the control unit 603 obtains the format information on the obtained AV signal from the wired transmitting and receiving unit 201.

Next, the control unit 603 checks the format information table 207, and obtains the format information. The control unit 603 also checks whether the format information obtained from the wired transmitting and receiving unit 201 is the same as that stored in the format information table 207.

Here, if the format information obtained from the wired transmitting and receiving unit 201 is the same as that stored in the format information table 207, the control unit 603 returns to Step S701. In this case, the format converting unit 609 performs no conversion processing. Accordingly, the wireless transmitting and receiving unit 202 outputs the AV signal obtained from the source device 102 by the wired transmitting and receiving unit 201 as it is.

On the other hand, unless the format information obtained from the wired transmitting and receiving unit 201 is the same as that stored in the format information table 207, the control unit 603 obtains the format information from the format information table 207, and outputs the format information to the format converting unit 609. Additionally, the control unit 603 instructs the format converting unit 609 to convert the format of the AV signal obtained from the wired transmitting and receiving unit 201 to the format specified by the obtained format information.

The format converting unit 609 converts the AV signal obtained from the wired transmitting and receiving unit 201 to the format specified by the format information obtained from the control unit 603. Then, the format converting unit 609 outputs the converted format to the wireless transmitting and receiving unit 202. The wireless transmitting and receiving unit 202 outputs the AV signal having the converted format to the adaptor device for the sink device 105.

Figure 9:
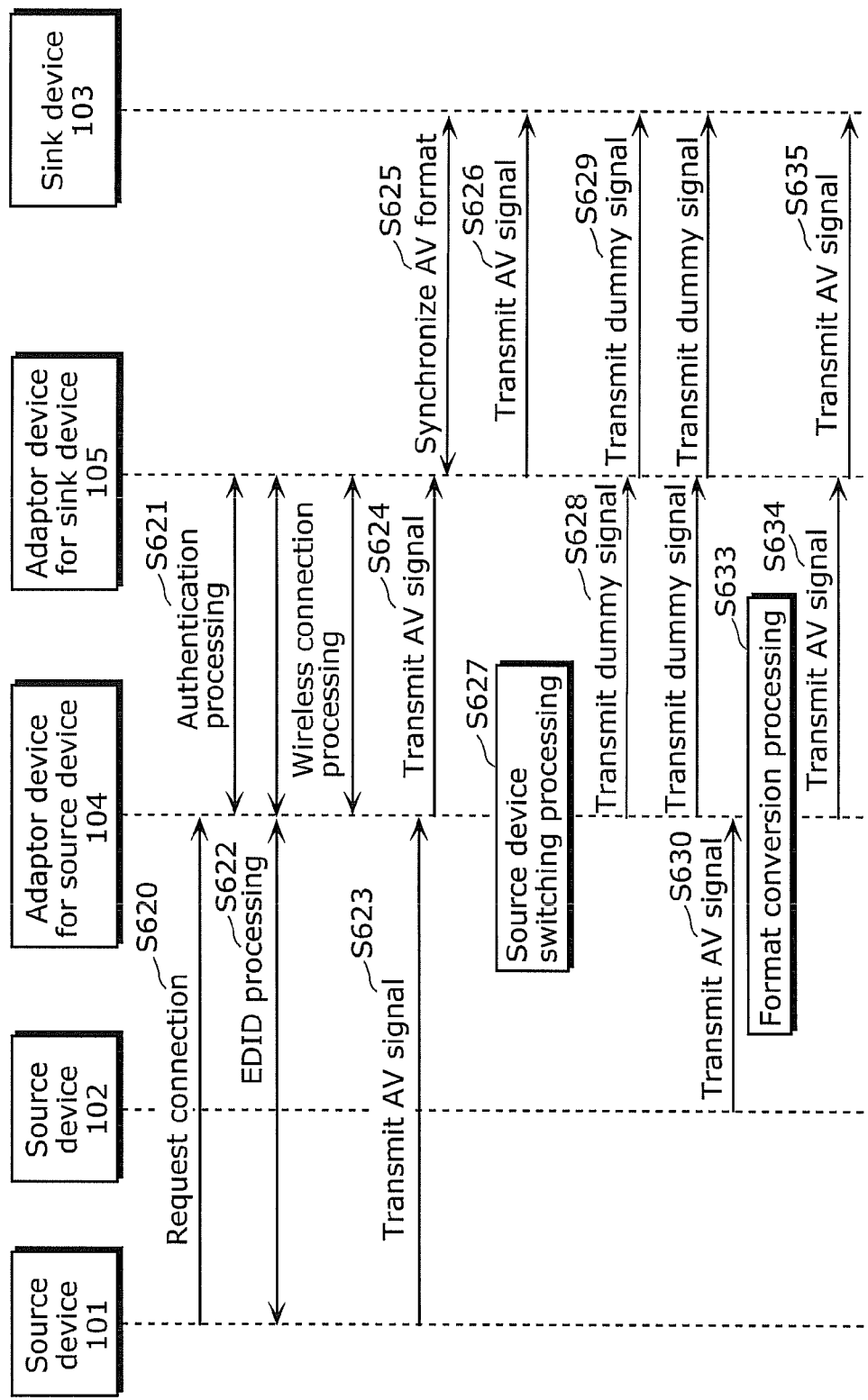
FIG. 9 is a drawing showing a sequence of the processings among devices that form a wireless communications system according to Embodiment 2 of the present invention.

FIG. 9 is a drawing showing a sequence of the processings among the devices that form the wireless communications system 100 according to Embodiment 2 of the present invention described above.

The assumptions in the sequence shown in FIG. 9 and processing performed in the respective steps having the same reference numerals are the same as those in Embodiment 1 shown in FIG. 6. Accordingly, the detailed description thereof will be omitted, and differences from the sequence shown in FIG. 6 will be mainly described. Suppose that the format of the video signal in the source device 101 is different from that in the source device 102.

After the source device connected to the wired transmitting and receiving unit 201 is switched from the source device 101 to the source device 102, the AV signal to be output from the source device 102 is transmitted to the adaptor device for the source device 104 (S630).

When the control unit 603 detects the AV signal, the control unit 603 instructs the format converting unit 609 to convert the format of the AV signal.

The format converting unit 609 converts the AV signal obtained from the wired transmitting and receiving unit 201 to the format specified by the format information stored in the format information table 207 (S633).

Subsequently, the wireless transmitting and receiving unit 202 wirelessly transmits the AV signal after conversion of the format to the adaptor device for the sink device 105 (S634). Furthermore, the adaptor device for the sink device 105 transmits the received AV signal to the sink device 103 (S635).

In the configuration according to the present embodiment, the AV signal output from the wired transmitting and receiving unit 201 is always output to the format converting unit 609. Alternatively, the control unit 603 may control the output destination of the wired transmitting and receiving unit 201 in a manner such that the AV signal is output to the format converting unit 609 only when the format needs to be converted, and the AV signal is output to the wireless transmitting and receiving unit 202 in other cases.

In the present embodiment, assuming the case where the source device is switched, the timing to convert the format has been described. It can be thought that the same format conversion processing is performed, for example, in the case where the same source device outputs an AV signal having a different format. In this case, as a processing performed in Step S701, the control unit 603 may determine whether the format of the AV signal obtained by the wired transmitting and receiving unit 201 is different from the format of the AV signal immediately previously obtained.

In Embodiments 1 and 2, the format information for specifying the format of the AV signal output from the currently connected source device is used as the format information stored in the format information table 207. Alternatively, using one of the rules shown below, for example, the control unit 203 may determine the format information stored in the format information table 207.

(A) With reference to the EDID information obtained from the EDID table, of formats of the AV signal that can be displayed in the currently connected sink device, only the format information for specifying the format allowing wireless transmission with desired transmission quality and corresponding to the video and audio with the highest quality is stored.

(B) With reference to the EDID information obtained from the EDID table, of formats of the AV signal that can be displayed in the currently connected sink device, only the format information for specifying the format allowing wireless transmission with desired transmission quality, obtaining the video and audio with the highest quality, and having the minimum channel capacity needed for transmission or the minimum consumption energy is stored.

(C) The formats of the AV signal previously input are stored as a history in the storage unit 206 for a predetermined period of time or predetermined number of times, and only the format information for specifying the format having the highest frequency in the history is stored.

(D) Each of the formats of the AV signal previously input is stored in association with a specific state to express the format as a probability model a Bayesian network. Only the format information for specifying the format having the highest probability to be input next using the probability model is stored.

The rules of determining the format information stored in the format information table 207 by the control unit 203 will not be limited to those above, and any rule using at least one of quality of wireless transmission, quality of the video, quality of the audio, the dedicated channel capacity, consumption energy, and selection probability as a reference may be used.

As described above, the adaptor device for the source device 104 provided with the wireless communications system 100 according to the present embodiment includes the configuration described in Embodiment 1, and further the format converting unit 609 that converts the format of the video signal. By the control unit 603, the format converting unit 609 converts the format of the video signal obtained from the source device to the format specified by the format information stored in the format information table 207 that the storage unit 206 has, if the formats are not the same.

According to the configuration, in the case where the source device is switched, the format of the video signal output from the new source device can be converted to other format by the format converting unit. As a result, for example, even if the video signals output from a plurality of source devices have different formats, the formats are converted into the same format and output. Thereby, the synchronization of the format of the video signal between the sink device and the adaptor device for the sink device that form a wireless communications system can be maintained. Accordingly, in the case where the source device to be connected is switched, the switching time until the video signal of a switching destination is displayed in the sink device can be reduced.

Alternatively, the control unit 603 may store a history regarding the format information for specifying the format of the video signal obtained from a source device (for example, the source device 101) and the format information for specifying the format of the video signal obtained from other source device other than the source device 101 (for example, the source device 102) for a predetermined period of time. The control unit 603 may store the format information most frequently obtained in the history in the format information table 207 that the storage unit 206 has.

Thereby, even if the format of the video signal before switching the source device is different from that after switching the source device, the dummy signal generating device can predict a format having the highest probability as the format of the video signal obtained from the source device after switching, and generate a dummy signal having the same format as the predicted format.

Alternatively, in the format information table 207 that the storage unit 206 has, the control unit 603 may store the format information for specifying the format corresponding to the video with the highest quality of a plurality of formats of the video signals that can be displayed on the display unit (for example, the sink device 103) that displays the video signal wirelessly transmitted from the wireless transmitting and receiving unit 202.

Thereby, even if the formats of the video signals output from a plurality of source devices are different, the format converting unit can always convert the formats to the same format as that of the video having the highest quality that the display device can treat. Accordingly, the synchronization of the format of the video signal between the sink device and the adaptor device for the sink device that form the wireless communications system can be maintained, and the sink device can display the video having the highest quality.

In Embodiments 1 and 2, a DRAM (Dynamic Random Access Memory) is used as a specific configuration of the storage unit 206. However, the present invention will not be limited to this configuration. Instead of the DRAM, a high speed memory device such as an SRAM (Static Random Access Memory) may be used. Use of a non-volatile memory device can reduce a connection time after turning the power supply of the adaptor device on.

The source device may have the function of the adaptor devices for the source device 104 according to Embodiments 1 and 2 of the present invention and 2. In this case, the source device according to the embodiment of the present invention includes a signal reproducing unit for a DVD player, for example, instead of the wired transmitting and receiving unit 201 in the adaptor device for the source device 104.

Figure 10:
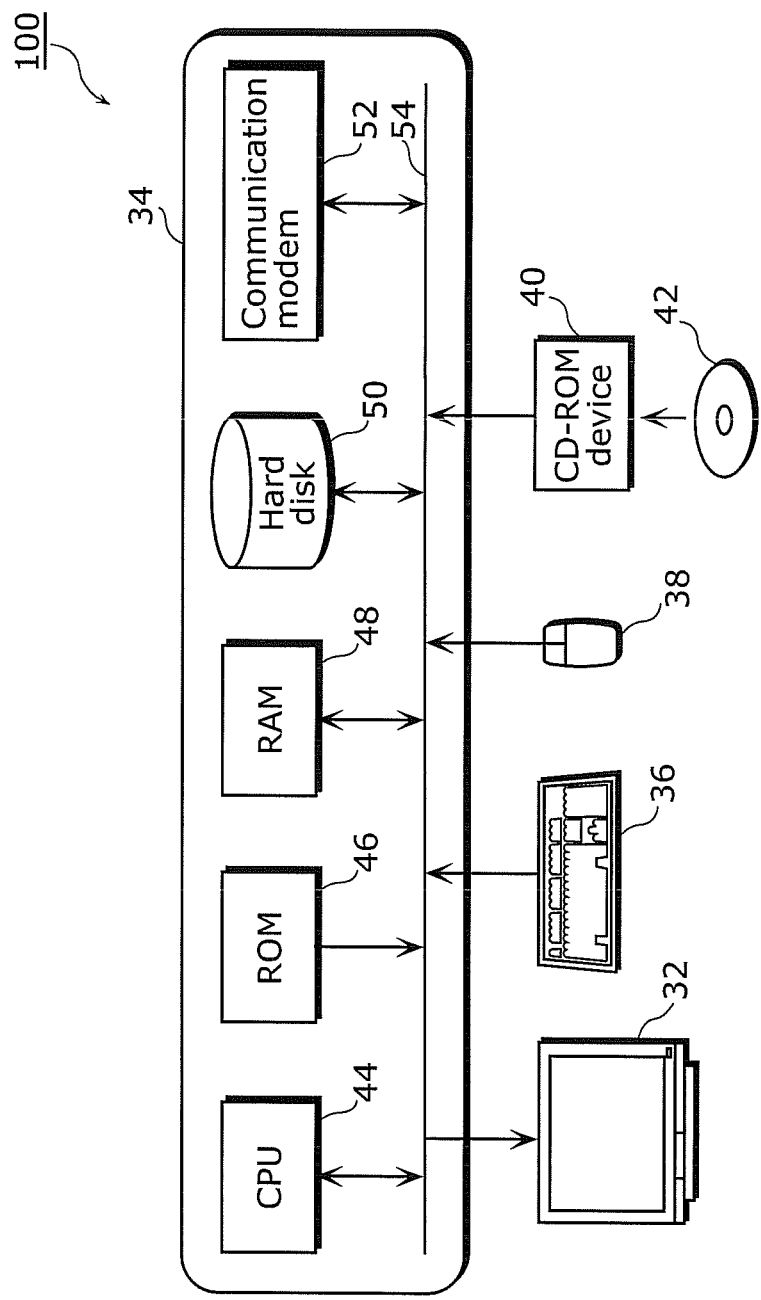
FIG. 10 is a block diagram showing a hardware configuration of a computer system that implements a wireless communications system according to Embodiment 1 or 2 of the present invention.
Figure 11:
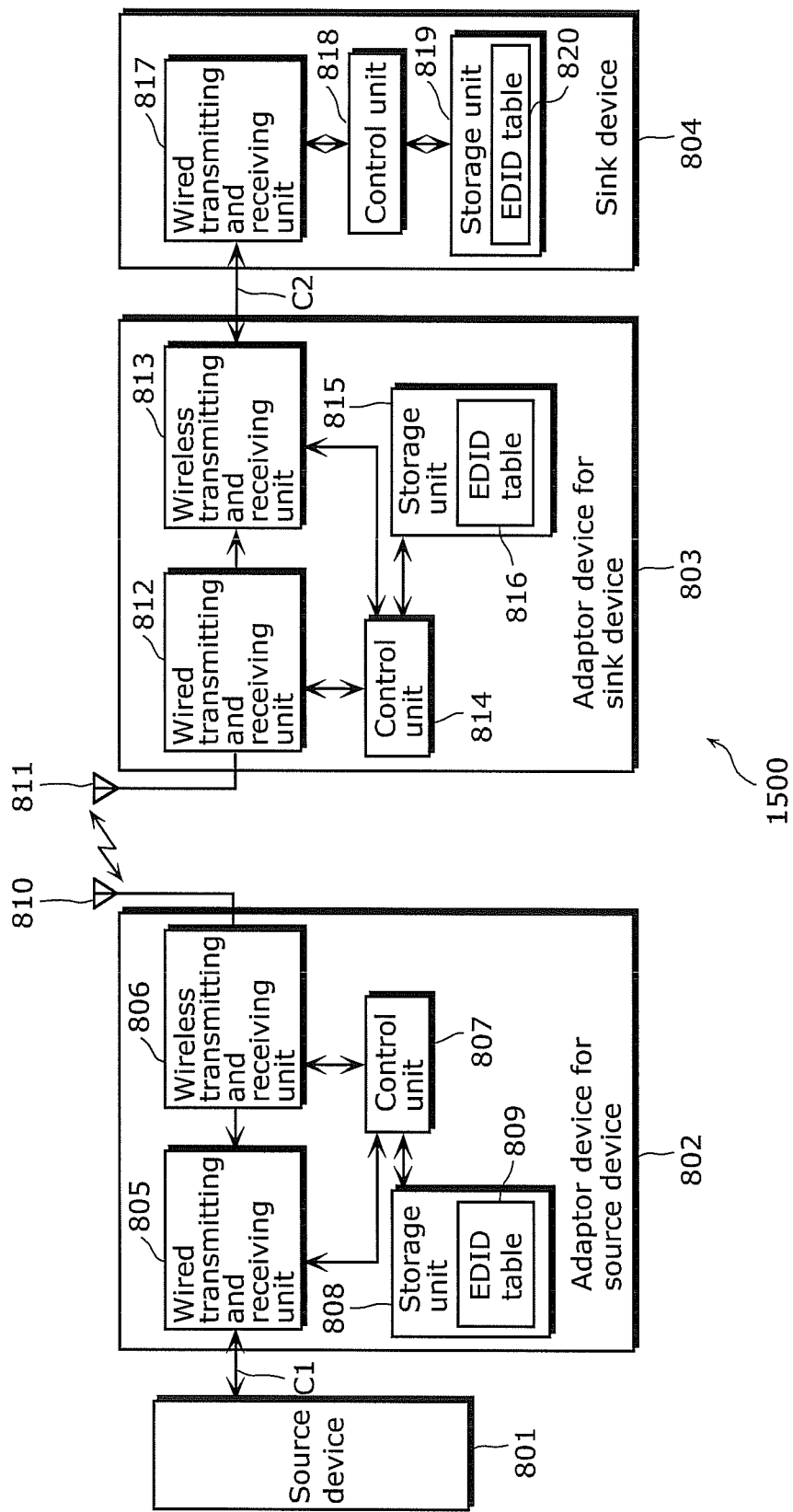
FIG. 11 is a block diagram showing a configuration of the conventional wireless communications system.

The wireless communications system 100 including the adaptor devices for the source device 104 according to Embodiments 1 and 2 can also be implemented by a computer. FIG. 10 is a block diagram showing a hardware configuration of a computer system that implements the wireless communications system 100.

The wireless communications system 100 includes a computer 34, a keyboard 36 and a mouse 38 that instruct the computer 34, a display 32 for displaying a result of a computation by the computer 34, and a CD-ROM (Compact Disc-Read Only Memory) device 40 and communication modem (not illustrated) for reading a program executed by the computer 34.

The program that is a processing executed by the wireless communications system 100 is stored in the CD-ROM 42 as a computer-readable medium, and read by the CD-ROM device 40. Alternatively, the program is read by the communication modem 52 via a computer network.

The computer 34 includes a CPU (Central Processing Unit) 44, a ROM (Read Only Memory) 46, a RAM (Random Access Memory) 48, a hard disk 50, a communication modem 52, and a bus 54.

The CPU 44 executes the program read by the CD-ROM device 40 or via the communication modem 52. The ROM 46 stores a program needed for operation of the computer 34 and data. The RAM 48 stores data such as parameters when the program is executed. The hard disk 50 stores programs and data. The communication modem 52 communicates with other computer via the computer network. The bus 54 connects the CPU 44, the ROM 46, the RAM 48, the hard disk 50, the communication modem 52, the display 32, the keyboard 36, the mouse 38, and the CD-ROM device 40 to each other.

Furthermore, part or all the components that form the respective devices may be formed with a single system LSI (Large Scale Integrated Circuit). The system LSI is an ultra multifunctional LSI manufactured by integrating a plurality of components on a single chip, and specifically a computer system including a microprocessor, a ROM, and a RAM. The RAM stores a computer program. The microprocessor operates according to the computer program, and thereby the system LSI achieves the function.

Furthermore, part or all the components that form the respective devices may be form with an IC card detachably attached to each of the devices or a single module. The IC card or module is a computer system including a microprocessor, a ROM, and a RAM. The IC card or module may include the ultra multifunctional LSI above. The microprocessor operates according to the computer program, and thereby the IC card or module achieves the function. The IC card or the module may have tamper proofness.

Moreover, the present invention may be the method shown above. Alternatively, the present invention may be a computer program causing a computer to execute the method, or digital signals of the computer program.

Further, the present invention may be the computer program or digital signals recorded in a computer-readable recording medium such as flexible disks, hard disks, CD-ROMs, MOs, DVDs, DVD-ROMs, DVD-RAMs, BDs (Blu-ray Discs (registered trademark)), USB memories, memory cards such as SD cards, and semiconductor memories. Alternatively, the present invention may be the digital signal recorded in these recording media.

The present invention may be the computer program or digital signals transmitted via an electrical communication line, a wireless or wired communication line, a network such as the Internet, and data broadcasting.

The present invention may be a computer system including a microprocessor and a memory. The memory may store the computer program, and the microprocessor may operate according to the computer program.

Moreover, the program or the digital signals may be recorded in the recording medium and transferred, or the program or the digital signals may be transferred via the network or the like. Thereby, the present invention may be implemented by other independent computer system.

Further, the embodiments and modifications thereof may be combined.

The embodiments disclosed here are only examples in all respects, and it should be not taken as limitation. The scope of the present invention is specified by the scope of Claims not by the description above, and it is intended that meaning equivalent to the scope of Claims and changes within the scope are included.

INDUSTRIAL APPLICABILITY

The adaptor device for the source device, wireless communications system, and control method thereof according to the present invention can be used for AV systems such as a DVD player and a television receiver, for example.

REFERENCE SIGNS LIST

32 Display
34 Computer
36 Keyboard
38 Mouse
40 CD-ROM device
42 CD-ROM
44 CPU
46 ROM
48 RAM
50 Hard disk
52 Communication modem
54 Bus
100, 1500 Wireless communications system
101, 102 Source device
103 Sink device
104 Adaptor device for source device
105 Adaptor device for sink device
106, 107, 108 Cable
201, 303 Wired transmitting and receiving unit 202, 302 Wireless transmitting and receiving unit
203, 304, 603 Control unit
204 Dummy signal generating unit
205, 306 EDID table
206, 305 Storage unit
207 Format information table
208, 301 Antenna
609 Format converting unit

The invention claimed is:

1. An adaptor device wire-connected to a source device that outputs a video signal, said adaptor device wirelessly transmitting the video signal obtained from the source device and comprising:
　a memory which stores video signal format information that is information indicating a video signal format of the video signal;
　a processor which generates a dummy signal that is a dummy video signal having a same format as the video signal format specified by the video signal format information obtained from said memory; and
　a wireless transmitting and receiving unit which selectively wirelessly transmits the video signal and the generated dummy signal,
　wherein said processor generates the dummy signal and causes said wireless transmitting and receiving unit to transmit the generated dummy signal in order to maintain the wireless transmission performed by said wireless transmitting and receiving unit when the video signal is not obtained from the source device, and
　wherein said processor stores a history regarding the video signal format information for specifying the video signal format of the video signal obtained from the source device and an other video signal format information for specifying an other video signal format of an other video signal obtained from an other source device different from the source device for a predetermined period of time, and stores historical video signal format information most frequently obtained in the history in said memory.

2. The adaptor device according to claim 1,
　wherein said processor generates the dummy signal during a period from a time when said processor starts a processing of switching the source device, from which the video signal is obtained, from the source device to the other source device different from the source device to a time when the other video signal output from the other source device is obtained.

3. The adaptor device according to claim 1,
　wherein said processor stores the video signal format information for specifying the video signal format of the video signal obtained from the source device in said memory.

4. An adaptor device wire-connected to a source device that outputs a video signal, said adaptor device wirelessly transmitting the video signal obtained from the source device and comprising:
　a memory which stores video signal format information that is information indicating a video signal format of the video signal;
　a processor which generates a dummy signal that is a dummy video signal having a same format as the video signal format specified by the video signal format information obtained from said memory; and
　a wireless transmitting and receiving unit which selectively wirelessly transmits the video signal and the generated dummy signal,
　wherein said processor generates the dummy signal and causes said wireless transmitting and receiving unit to transmit the generated dummy signal in order to maintain the wireless transmission performed by said wireless transmitting and receiving unit when the video signal is not obtained from the source device, and
　wherein said processor stores, in said memory, other video signal format information for specifying an other video signal format corresponding to an other video signal format of a video with a highest quality of a plurality of other video signal formats that can be displayed on a display unit that displays the video signal wirelessly transmitted from said wireless transmitting and receiving unit.

5. A method for controlling an adaptor device, the adaptor device wire-connected to a source device that outputs a video signal, the adaptor device wirelessly transmitting the video signal obtained from the source device, said method comprising:
　storing, in a memory, video signal format information that is information indicating a video signal format of the video signal;
　generating a dummy signal that is a dummy video signal having a same format as the video signal format specified by the video signal format information obtained in the storing;
　selectively wirelessly transmitting the video signal and the generated dummy signal using a wireless transmitting and receiving unit;
　controlling the generation of the dummy signal in said dummy signal generating and the transmission of the generated dummy signal in said wirelessly transmitting in order to maintain the wireless transmission performed by the wireless transmitting and receiving unit when the video signal is not obtained from the source device; and
　storing a history regarding the video signal format information for specifying the video signal format of the video signal obtained from the source device and an other video signal format information for specifying an other video signal format of an other video signal obtained from an other source device different from the source device for a predetermined period of time, and storing historical video signal format information most frequently obtained in the history in the memory.

6. The method for controlling an adaptor device according to claim 5,
　wherein in said controlling,
　the dummy signal is generated in said dummy signal generating
　during a period from a time when a processing of switching the source device, from which the video signal is obtained, from the source device to the other source device different from the source device is started
　to a time when the other video signal obtained from the other source device is obtained.

7. The method for controlling an adaptor device according to claim 5, the method further comprising:
　converting the video signal format of the video signal,
　wherein in said controlling, the video signal format of the video signal obtained from the source device is converted, in said converting, to an additional video signal format specified by the video signal format information stored in said storing if the video signal format and the additional video signal format are not the same.

8. A wireless transmission system in which a video signal is wirelessly transmitted, said system comprising:
- a source device to output a video signal;
- a memory which stores video signal format information that is information indicating a video signal format of the video signal;
- a processor which generates a dummy signal that is a dummy video signal having a same format as the video signal format specified by the video signal format information obtained from said memory; and
- a wireless transmitting and receiving unit which selectively wirelessly transmits the video signal and the generated dummy signal,
- wherein said processor generates the dummy signal and causes said wireless transmitting and receiving unit to transmit the generated dummy signal in order to maintain the wireless transmission performed by said wireless transmitting and receiving unit when the video signal is not obtained from said source device, and
- wherein said processor stores a history regarding the video signal format information for specifying the video signal format of the video signal obtained from the source device and an other video signal format information for specifying an other video signal format of an other video signal obtained from an other source device different from the source device for a predetermined period of time, and stores historical video signal format information most frequently obtained in the history in said memory.

9. An adaptor device wire-connected to a source device that outputs a video signal, said adaptor device wirelessly transmitting the video signal obtained from the source device and comprising:
- a memory which stores video signal format information that is information indicating a video signal format of the video signal;
- a processor which generates a dummy signal that is a dummy video signal having a same format as the video signal format specified by the video signal format information obtained from said memory; and
- a wireless transmitting and receiving unit which selectively wirelessly transmits the video signal and the generated dummy signal,
- wherein said processor generates the dummy signal and causes said wireless transmitting and receiving unit to transmit the generated dummy signal in order to maintain the wireless transmission performed by said wireless transmitting and receiving unit when the video signal is not obtained from the source device,
- wherein said processor converts the video signal format of the video signal obtained from the source device to an additional video signal format specified by the video signal format information stored in said memory if the video signal format and the additional video signal format are not the same, and
- wherein said processor stores a history regarding the video signal format information for specifying the video signal format of the video signal obtained from the source device and an other video signal format information for specifying an other video signal format of an other video signal obtained from an other source device different from the source device for a predetermined period of time, and stores historical video signal format information most frequently obtained in the history in said memory.

10. An adaptor device wire-connected to a source device that outputs a video signal, said adaptor device wirelessly transmitting the video signal obtained from the source device and comprising:
- a memory which stores video signal format information that is information indicating a video signal format of the video signal;
- a processor which generates a dummy signal that is a dummy video signal having a same format as the video signal format specified by the video signal format information obtained from said memory; and
- a wireless transmitting and receiving unit which selectively wirelessly transmits the video signal and the generated dummy signal,
- wherein said processor generates the dummy signal and causes said wireless transmitting and receiving unit to transmit the generated dummy signal in order to maintain the wireless transmission performed by said wireless transmitting and receiving unit when the video signal is not obtained from the source device,
- wherein said processor converts the video signal format of the video signal obtained from the source device to an additional video signal format specified by the video signal format information stored in said memory if the video signal format and the additional video signal format are not the same, and
- wherein said processor stores, in said memory, other video signal format information for specifying an other video signal format corresponding to an other video signal format of a video with a highest quality of a plurality of other video signal formats that can be displayed on a display unit that displays the video signal wirelessly transmitted from said wireless transmitting and receiving unit.

11. A method for controlling an adaptor device for, the adaptor device wire-connected to a source device that outputs a video signal, the adaptor device wirelessly transmitting the video signal obtained from the source device, said method comprising:
- storing video signal format information that is information indicating a video signal format of the video signal;
- generating a dummy signal that is a dummy video signal having a same format as the video signal format specified by the video signal format information obtained in the storing;
- selectively wirelessly transmitting the video signal and the generated dummy signal using a wireless transmitting and receiving unit;
- controlling the generation of the dummy signal in said dummy signal generating and the transmission of the generated dummy signal in said wirelessly transmitting in order to maintain the wireless transmission performed by the wireless transmitting and receiving unit when the video signal is not obtained from the source device; and
- storing other video signal format information for specifying an other video signal format corresponding to an other video signal format of a video with a highest quality of a plurality of other video signal formats that can be displayed on a display unit that displays the video signal wirelessly transmitted from the wireless transmitting and receiving unit.

* * * * *